Patented Nov. 7, 1933

1,934,297

UNITED STATES PATENT OFFICE 1,934,297

COMPOUNDS OF POLYMERIZED VINYL ESTERS AND FATTY OILS

Alexander Eibner, Willy O. Herrmann, Wolfram Haehnel, and Martin Miller, Munich, Germany, assignors to Consortium für Elektrochemische Industrie, G. m. b. H., Bavaria, Germany, a corporation of Germany No Drawing. Application December 12, 1930, Serial No. 501,922, and in Germany December 31, 1929

20 Claims. (Cl. 260—2)

Compounds of polymerized vinyl esters and fatty oils have not been heretofore known. In the production of lacquers, polymerized vinyl esters are dissolved with oils in solvents, but no chemical reaction occurs under these circumstances. The lacquers obtained by this manner contain the polymerized vinyl esters and the oils unchanged. Therefore ingredients of the mixture may be isolated again, for instance by fractional precipitation and identified by chemical reactions, for instance by saponification. In U. S. A. Patent No. 1,241,738, describing the production of polymerized vinyl esters, it is pointed out, that the properties of the polymerized vinyl esters may be modified by admixtures of different substances. The chemical nature of the polymerized vinyl esters remains substantially unchanged. As such admixtures, which influence the properties of the polymerized vinyl esters in a physical respect, oils and many other substances are mentioned. The result is the same, if such additions are made before or after the polymerization of the vinyl esters. No chemical action of the oils is stated, the result of all such additions of very different nature being only a physical mixture with regard to color, transparency, hardness and flexibility while the essential properties of the polymerized vinyl esters and also of the oils remain unchanged.

Now we have found that chemical compounds of polymerized vinyl esters and fatty oils may be obtained by polymerizing vinyl esters with products of the polymerization of fatty oils. The chemical compounds obtained by this process are characterized by specific properties. They cannot be separated into polymerized vinyl esters and oils by physical methods as for instance by fractional dissoluting or reprecipitating. Their nature as chemical compounds is also shown by chemical reactions. The saponification by means of alkalies or acids does not give the corresponding acid numbers of the components. New and original compounds are formed.

As initial materials for the production of the polymerized fatty oils—the intermediary products—, the fatty oils which can be polymerized are applicable. Linseed oil, soya bean oil, perilla oil, poppy-seed oil are specifically named as examples.

The polymerization of the oils is characterized by thickening, decrease of the iodine number and increase of the drying power. It may be effected by known methods, for instance by prolonged storing, by heating with or without the action of air or oxygen containing gases, by dark electrical discharges, by irradiation or by oxidizing agents. Especially suitable are the oils which are polymerized while excluding air.

These products contain besides the polymerized part, portions of nonpolymerized oil and of by-products. These polymerized oils generally may be immediately combined with the vinyl esters according to our invention. Exceedingly pure compounds of the polymerized vinyl esters with the polymerized oils are obtained by removing from the oil mixtures obtained by polymerization, the portion of low molecular weight and other impurities before combining them with the vinyl esters. This may be effected by many methods, for instance by separating and isolating the portion of higher molecular weight by freezing it out, by centrifuging, by precipitating it as a compound of adsorption which can be decomposed again, for instance with fuller's earth or by isolating it as an additional chemical compound, for instance with sulfuric acid, metallic oxides or salts. The portion of low molecular weight may also be removed by diffusion or osmotic processes or by extracting it from the raw polymerized product by any way.

Suitable solvents for this extraction are alcohols like propanol, butanol, amyl alcohol, ketones like acetone and diethylketone, esters like glycol diacetate, glycol butyrate-acetate, methyl ester of malonic acid and mixtures of such substances with other solvents like ethanol, acetic ester. In many cases the extraction may be advantageously carried out by reprecipitation. For instance the polymerized oil is dissolved in the solvents named above by heating or it is only emulsified if the iodine number of the product is very low. By cooling down to lower temperatures the portion of high molecular weight will be precipitated. In using for instance butanol, for one part of the polymerized oil generally two to four parts of butanol are useful for this kind of reprecipitating. This operation may also be carried out in such a manner, that the polymerized oil is dissolved in a solvent and the portion of high molecular weight is precipitated out by addition of one or more other suitable substances. Suitable solvents are the alcohols with more than two carbon atoms, the phenols, esters of mono- or polyvalent alcohols, the aliphatic and aromatic hydrocarbons and their chlorinated derivatives, oil of turpentine, terpenes or the like. For precipitation ethanol or acetone are suitable.

By this way also purified polymerized oils of the kind are obtained which are described in U. S. A. application of A. Eibner, S. N. 449,059 and are called "phases of low dispersity."

The previous purification of the polymerized oils from portions of low molecular weight is useful for the production of the pure compounds of polymerized vinyl esters. The purification may also be carried out by any other method of effecting the desired separation into portions of low and high molecular weight. The content of nonpolymerized parts may be reduced also by adding to a nonpurified polymerized oil a polymerized oil freed from parts of low molecular weight.

When starting from nonpurified polymerized oils the pure compounds of the polymerized vinyl esters with the polymerized oils may also be produced in such a way that the parts of low molecular weight and other impurities are elminated from the reaction product after effecting the process of the chemical combination. For carrying out this subsequent purification, the same methods are as used in the purification of the polymerized oils, for instance reprecipitating from a solvent like butanol and so on.

The polymerization of the vinyl esters in presence of the intermediary products of polymerization of the fatty oils may be effected by any means, for instance by catalysts, by pressure, by irradiation and so on. It is to be understood that the different methods of polymerization may also be combined. The proportion of vinyl esters and the polymerized oils may vary within wide limits. For carrying out the process a vinyl ester or a mixture of vinyl esters in the desired proportion is mixed with one or several products of polymerization or "phases of low dispersity" of fatty oils and the polymerization is effected as described before. The course of reaction or the nature of the products of polymerization may be influenced by adding suitable materials like resins, softening agents, solvents and the like.

Such additional substances may also be polymerized vinyl esters. Therefore the vinyl esters to be used may be polymerized first to a certain degree, then adding the polymerized oils which will combine with the not yet polymerized part of the vinyl esters in the further course of the polymerization.

The reaction may also be influenced by stopping the polymerization at a desired stage. According to the desired properties of the reaction products it may be advantageous to stop the polymerization when only a small percent of the vinyl esters is polymerized or the polymerization may be continued until the vinyl ester is substantially polymerized. Generally the polymerized portion of the vinyl ester will be between the and ninety percent of the original quantity.

By the described process, compounds of polymerized vinyl esters and polymerized oils may be manufactured in which the proportions of components vary within wide limits.

Thus new valuable products are obtainable. Among them some are soluble in the usual organic solvents especially in oil or turpentine, sangay oil (the fraction of Borneo petroleum oil which distills between 140° and 190° C.) tetraline and the like. These products are suitable for the manufacture of lacquers especially of oil lacquers, combined oil lacquers, rust preventing paints, filling up materials and other similar purposes. Of course they may be combined with pigments, fillers, other materials for lacquers, with oils, siccatives and so on. They may be further used for the production of sticking materials, especially for irreversible sticking materials and like products. The soluble and also the insoluble or difficultly soluble kinds may be used in the manufacture of molded articles of any nature such as electric insulating material, records, buttons and the like.

Example I 200 kg. of vinylacetate are mixed in a vessel while stirring with 50 kg. of the portion of high molecular weight of stand oil of linseed oil obtained from the stand oil by reprecipitating it by means of butanol as described. 1.6 kg. benzoyl superoxide are added and the reaction is carried out by boiling in a reflux condenser. After the polymerization of about 40% of the vinyl acetate, the mass is thick and the polymerization is stopped by rapid cooling. After distilling off the unchanged vinyl-acetate, a tough product is obtained, which is readily soluble in oil of turpentine, sangay oil (the fraction of Borneo petroleum oil which distills between 140° and 190° C.) and tetraline and is suitable for lacquers of any kind, filling up materials and so on.

Example II

By continuing the polymerization described in Example I until the reaction has ceased, a solid elastic product insoluble in oil of turpentine, sangay oil (the fraction of Borneo petroleum oil which distills between 140° and 190° C.) and tetraline is obtained. This product remains elastic even at low temperatures.

Example III

A mixture of 90 kg. vinylacetate and 10 kg. vinylbutyrate is mixed in a vessel with 20 kg. of stand oil of soya beans and 1.5 kg. of benzoylsuperoxide are added. The polymerization is carried out by heating and then the operation is continued as described in Example I. This product is also soluble in the usual solvents for lacquers.

Example IV 2 kg. of vinylbutyrate are mixed with 2 kg. of stand oil of linseed oil (iodine number 148). 100 g. of benzoylsuperoxide are added and the polymerization is started by heating. When 80% of the vinyl ester is polymerized the reaction is stopped. Unchanged vinyl ester is distilled off and a product clearly soluble in sangay oil (the fraction of Borneo petroleum oil which distills between 140° and 190° C.) is obtained.

Example V

In 200 kg. of vinylacetate 10 kg. of polymerized vinylacetate are dissolved and 20 kg. of a perilla oil thickened by irradiation with ultraviolet light are added while stirring. The reaction is started by means of 0.2 kg. benzoyl superoxide and the mixture is kept boiling for 12 hours. The unchanged vinyl ester is distilled off, until a thick paste is formed. This is soluble in butylacetate, toluene, acetic ester. The solutions give excellent lacquers.

Example VI 100 kg. vinylacetate are mixed with 0.025 kg. benzoyl superoxide and polymerized by heating until 0.5 kg. polymerized vinyl acetate are formed. 12.5 kg. of poppy oil previously thickened by heating and blowing into it a finely dispersed stream of air, are charged into the mixture and the polymerization is carried on for 15 hours while stirring. The reaction product is recovered as described in Example V.

*Example VII*

50 kg. of vinyl propionate and 5 kg. of linoxyn are dissolved in 50 kg. of acetic ester. 1 kg. of dibutylphthalate and 5 kg. of benzoyl superoxide are added. The mixture is boiled for 24 hours, gradually adding a solution of 2.5 kg. rosin in 2.5 kg. acetic ester. The obtained solution may be used as a lacquer itself.

*Example VIII*

In a vessel 25 kg. standoil of linseed oil with an iodine number 101 are dissolved in 325 kg. of vinyl acetate. The solution is mixed with 32.5 gr. of benzoyl superoxide and boiled in a reflux condenser for 12 hours. After distilling off the bulk of the nonpolymerized vinyl acetate the rest of vinyl acetate is driven off by an overheated stream of butanol. 200 kg. butanol are condensed in the still. The hot solution thus obtained is cooled down to 50–60° C., the formed compound of polymerized vinyl acetate and oil precipitating out in compact flakes. By separating the solution which contains the impurities the product of reaction is obtained in a pure state especially suitable for lacquers.

In connection with our invention and the various examples given we wish to be understood that we do not confine ourselves to all the precise proportions or to the details herein set forth by way of illustration, as modifications and variations may be made as conditions may require or it may be deemed desirable, for example to vary the temperatures, proportion of quantity as well of the vinyl ester and the oils as the quantity and kind of the catalysts, the duration and grade of polymerization and so on.

What we claim is:

1. Process for producing compounds of polymerized vinyl esters and fatty oils comprising polymerizing vinyl esters with products of the polymerization of fatty oils.

2. Process for producing compounds of polymerized vinyl esters and fatty oils comprising polymerizing vinyl esters with products of the polymerization of fatty oils in the presence of at least one lacquer ingredient selected from the group consisting of resins, softening agents, solvents and polymerized vinyl esters.

3. Process for producing compounds of polymerized vinyl esters and fatty oils comprising polymerizing vinyl esters with products of the polymerization of fatty oils in the presence of solvents for the initial ingredients.

4. Process for producing compounds of polymerized vinyl esters and fatty oils comprising polymerizing vinyl esters with products of the polymerization of fatty oils, and stopping the joint reaction at a desired stage.

5. Process for producing compounds of polymerized vinyl esters and fatty oils comprising polymerizing vinyl esters with products of the polymerization of fatty oils polymerized while excluding air.

6. Process for producing compounds of polymerized vinyl esters and fatty oils comprising polymerizing vinyl esters with products of the polymerization of fatty oils after first removing the nonpolymerized parts from the oil.

7. Process for producing compounds of polymerized vinyl esters and fatty oils comprising polymerizing vinyl esters with products of the polymerization of fatty oils after first removing the nonpolymerized parts from the oil by extraction with suitable solvents.

8. Process for producing compounds of polymerized vinyl esters and fatty oils comprising polymerizing vinyl esters with products of the polymerization of fatty oils after first removing the nonpolymerized parts from the oil by reprecipitating the oil by means of butanol.

9. Process for producing compounds of polymerized vinyl esters and fatty oils comprising polymerizing vinyl esters with products of the polymerization of fatty oils polymerized while excluding air after first diminishing the nonpolymerized parts of the oil.

10. Process for producing compounds of polymerized vinyl esters and fatty oils comprising polymerizing vinyl esters with products of the polymerization of fatty oils polymerized while excluding air after first removing the nonpolymerized parts from the oil by extraction with suitable solvents.

11. Process for producing compounds of polymerized vinyl esters and fatty oils comprising polymerizing vinyl esters with products of the polymerization of fatty oils polymerized while excluding air after first removing the nonpolymerized parts from the oil.

12. Process for producing compounds of polymerized vinyl esters and fatty oils comprising polymerizing vinyl esters with products of the polymerization of fatty oils and then removing from the reaction product the nonpolymerized parts by extraction by means of a solvent.

13. Process for producing compounds of polymerized vinyl esters and fatty oils comprising polymerizing vinyl esters with products of the polymerization of fatty oils polymerized while excluding air after first removing the nonpolymerized parts from the oil by reprecipitating by means of butanol.

14. Compounds of polymerized vinyl esters and fatty oils obtained by polymerizing vinyl esters with products of the polymerization of fatty oils.

15. Compounds of polymerized vinyl esters and fatty oils obtained by polymerizing vinyl esters with products of the polymerization of fatty oils and stopping the joint reaction at a desired stage.

16. Lacquers and molded articles containing compounds of polymerized vinyl esters and fatty oils obtained by polymerizing vinyl esters with products of the polymerization of fatty oils.

17. Compounds of polymerized vinyl esters and fatty oils obtained by polymerizing vinyl esters with products of the polymerization of fatty oils after first removing the nonpolymerized parts from the oil by extraction with suitable solvents.

18. Compounds of polymerized vinyl esters and fatty oils obtained by polymerizing vinyl ester with products of the polymerization of fatty oils polymerized while excluding air after first removing the nonpolymerized parts from the oil.

19. Compounds of polymerized vinyl esters and fatty oils obtained by polymerizing vinyl ester with products of the polymerization of fatty oils polymerized while excluding air after first removing the nonpolymerized parts from the oil by reprecipitating the oil by means of butanol.

20. Compounds of polymerized vinyl esters and fatty oils obtained by polymerizing vinyl esters with products of the polymerization of fatty oils and then removing from the reaction product the nonpolymerized parts.

ALEXANDER EIBNER.
WILLY O. HERRMANN.
WOLFRAM HAEHNEL.
MARTIN MILLER.